July 11, 1950 J. M. HUMPHREY 2,515,008
CUTOFF SAW WITH LINE-OF-CUT INDICATOR
Filed Jan. 26, 1946 3 Sheets-Sheet 1
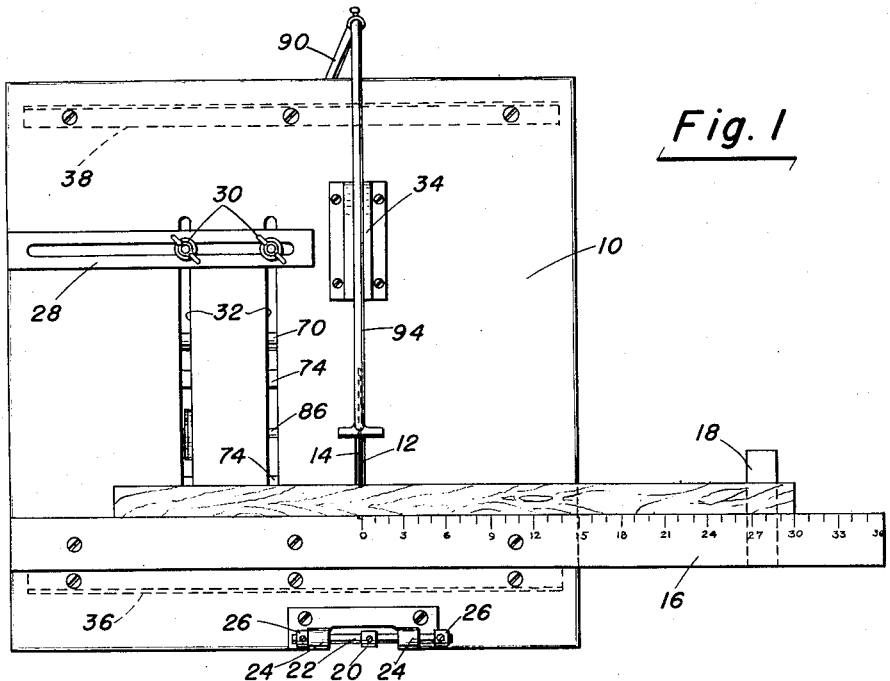
Fig. 1
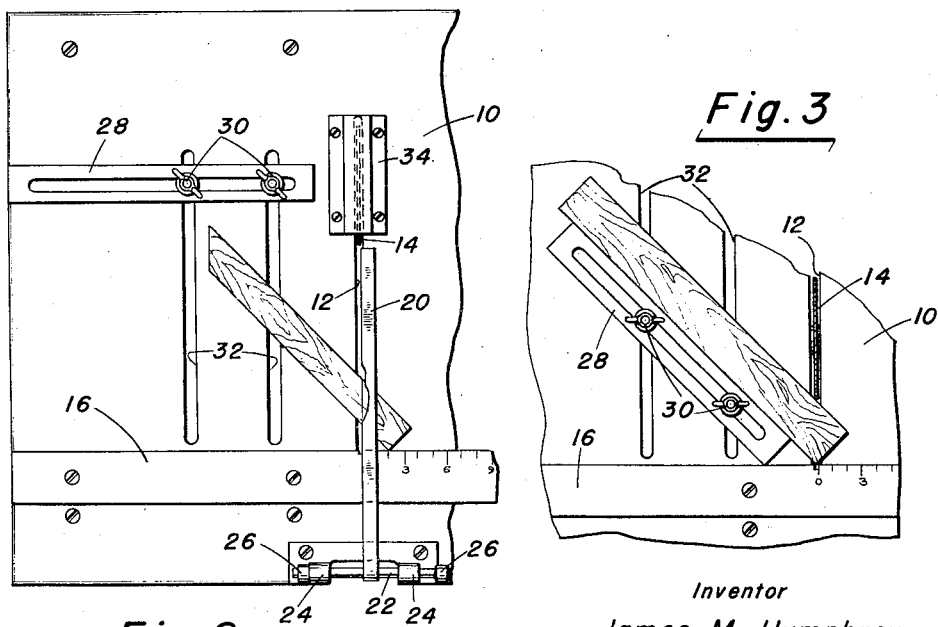
Fig. 2
Fig. 3
Inventor
James M. Humphrey
By *A. Yates Dowell*
Attorney

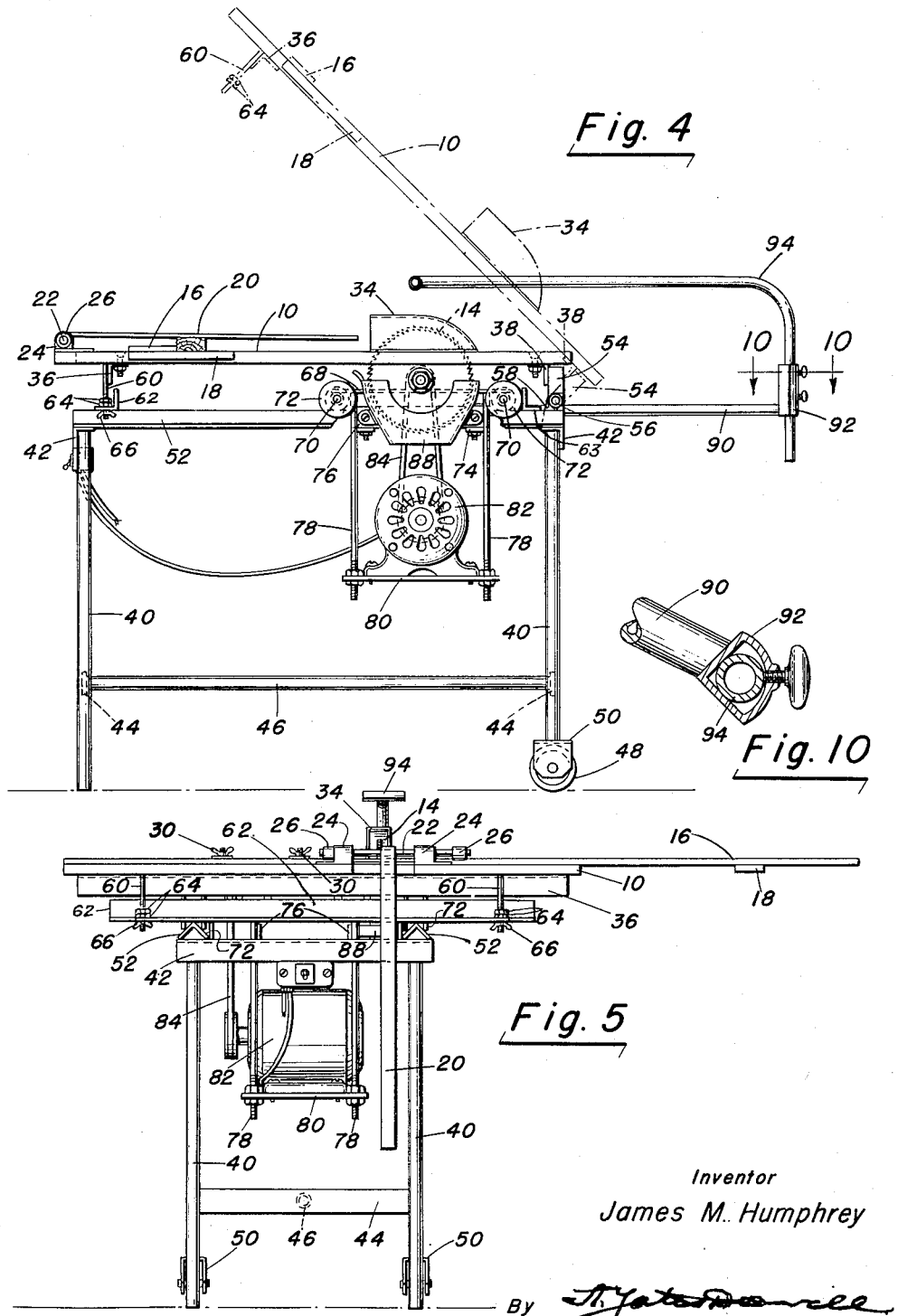

July 11, 1950     J. M. HUMPHREY     2,515,008
CUTOFF SAW WITH LINE-OF-CUT INDICATOR
Filed Jan. 26, 1946     3 Sheets-Sheet 3
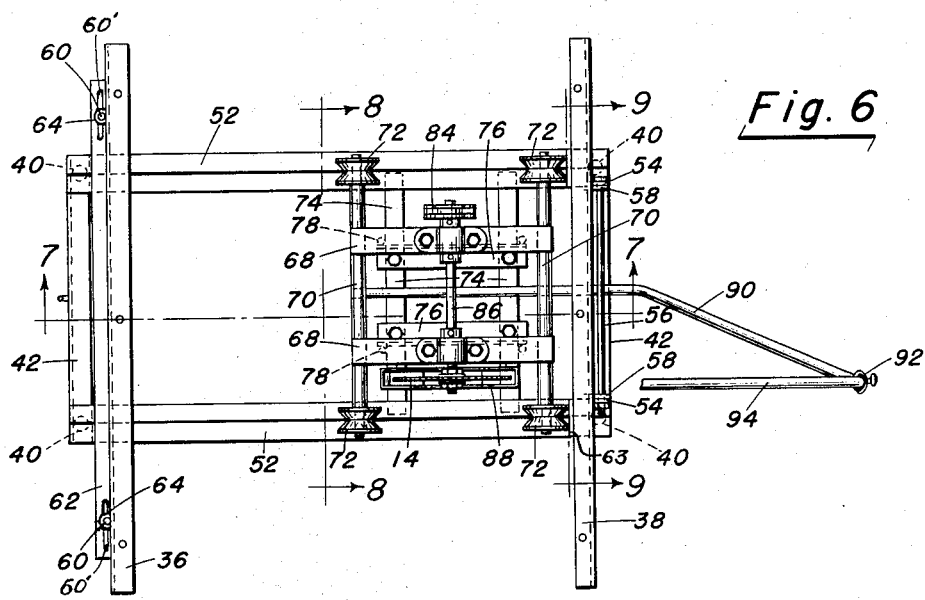
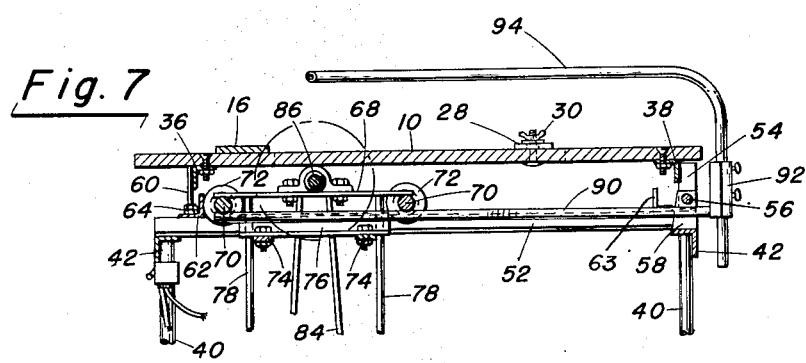
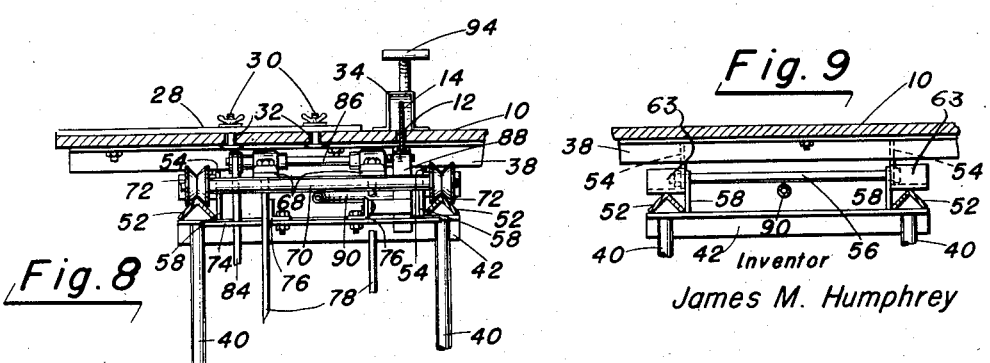
Inventor
James M. Humphrey Patented July 11, 1950

2,515,008

UNITED STATES PATENT OFFICE 2,515,008

CUTOFF SAW WITH LINE-OF-CUT INDICATOR

James M. Humphrey, New Richmond, Wis., assignor, by mesne assignments, of ninety per cent to Doughboy Industries, Inc., New Richmond, Wis., a corporation of Wisconsin Application January 26, 1946, Serial No. 643,632

7 Claims. (Cl. 143—47)

The present invention relates to improvements in cut-off saws of the type wherein a circular saw is caused to travel through the work piece which is held in stationary position and more particularly is concerned with portable cut-off saws.

An object of the invention is to provide a device which is extremely light in weight, inexpensive in cost and maintenance but which will perform with the same efficiency, whether on light or on heavy work, as the ordinary heavy and overpowered machines commonly employed in production shops.

It is a further object of the invention to provide a device which is adapted to cut all degrees of angle very simply without the necessary reference to adjustable guides or clamps.

Another object of the invention is to provide a device having means for maintaining the work table and traveling saw in constant alignment, which means is capable of adjustment to compensate for wear or accident.

Other and further advantages of the invention will become apparent from the following detailed explanation taken in conjunction with the accompanying drawings wherein a preferred embodiment of the principles of the invention has been selected for exemplification.

In the drawings:

Figure 1 is a plan view of a portable cut-off saw embodying features of the present invention;

Fig. 2, a fragmentary plan view showing the indicator blade in operative position;

Fig. 3, a fragmentary plan view showing the work guide in operative position;

Fig. 4, a side elevational view of the device illustrated in plan in Fig. 1;

Fig. 5, a front elevational view of the device in Fig. 4;

Fig. 6, a top plan view of the device shown in Figs. 4 and 5 but with the saw table removed;

Fig. 7, a fragmentary section taken on line 7—7 of Fig. 6;

Fig. 8, a fragmentary section taken on line 8—8 of Fig. 6;

Fig. 9, a fragmentary section taken on line 9—9 of Fig. 6; and

Fig. 10, a fragmentary section taken on line 10—10 of Fig. 4.

Referring more particularly to the drawings, wherein like numerals refer to like parts, a saw or work table 10 constructed of any suitable, preferably light-weight, material is provided with an elongated slot 12 through which the traveling circular saw 14 projects.

At the forward end of the saw table a graduated squaring guide 16 is removably secured to the table 10 in any suitable manner such as by threaded screws. A support 18 is carried by the squaring guide 16 proximate to the extended end thereof for the purpose of supporting long pieces of lumber in the manner indicated in Fig. 1.

An indicator blade 20 whose function will be hereinafter more particularly described is pivotally mounted at the forward end of the table 10 on a short shaft 22 rotatably mounted in end bearings 24 and having stop collars 26 adjacent its opposite ends. The table 10 is further provided with a work guide 28 attached to the table by means of bolts and wing nuts 30 which are slidable in slots 32 to adjust the work guide in operative position, such as is shown in Fig. 3.

A housing or guard 34 is removably secured to the table 10 at the remote extremity of the slot 12 for receiving the saw 14 when in normal or inoperative position. Table 10 further carries at the forward and rearward ends of its under surface L-frame members 36 and 38, respectively, which may be secured in any suitable manner as shown.

The frame or supporting structure for the saw table and saw carriage is composed of four upright tubular members 40 connected by upper transverse cross members 42 and by lower cross braces 44 at the forward and rearward ends of the device. A bracing member 46 extends between the cross braces 44 intermediate the ends thereof. The pair of upright members 40 at the rear of the device have mounted at their lower extremities rubber wheels 48 journaled in housings 50. The lower extremities of the forward pair of tubular members 40 are preferably extended to rest directly upon the floor so as to support the saw table normally in horizontal position. A pair of inverted V-shaped tracks 52 extends longthwise of the frame structure and are secured by any suitable means such as welding to the upper pair of cross members 42.

The table 10 is adapted to be hingedly mounted upon the frame structure and to this end ears 54 are secured to the under surface of the table preferably by welding to L-frame member 38. Ears 54 are hinged to rod 56 which extends transversely of the frame and is supported on the frame by upstanding lugs 58 which in turn are welded to cross member 42 at the rear of the frame.

A pair of rigid studs 60 may be secured, such as by welding, to the frame 36 carried by the forward end of table 10, these studs being engageable respectively in a pair of elongated apertures 60' provided in a cross frame member 62 (Figs. 6 and 7) which is welded or otherwise suitably secured to tracks 52. These studs and apertures are so related as to bring the table 10 into alignment with the saw 14 and, when adjustably secured by lock nuts 64 and wing nuts 66, are adapted to compensate for any wear or accident.

The saw carriage is movably supported on tracks 52 and is composed of a pair of longitudinal upper straps 68 secured at opposite ends to shafts 70 which rotatably support carriage rollers 72 provided with grooved peripheral surfaces mating substantially with the angular tracks 52. The carriage further is composed of a pair of transversely extending straps 74 connected by cross braces 76. The extremities of straps 74 are extended laterally to underlie tracks 52 to prevent any upward displacement of the carriage. Depending from the upper portion of the carriage structure are motor hangers 78 which carry at their lower extremities an adjustable platform 80 upon which an electric motor 82 is mounted. A V-shaped belt pulley 84 connects the drive shaft of motor 82 with the saw arbor 86 journaled at the upper portion of the carriage. Secured also to the upper portion of the carriage in a position adjacent to the saw 14 is a shield or a guard 88. Longitudinal travel of the carriage is limited forwardly by cross frame member 62 and rearwardly by stop members 63, likewise welded or otherwise suitably secured to tracks 52.

A pull handle is secured to the carriage whereby to control its movement along supporting tracks 52. This operating handle is preferably composed of a horizontal tubular portion 90 welded or otherwise suitably secured to the carriage at one end and carrying at its other end a collar 92 L-shaped in cross section which is adapted adjustably to receive the shank of tubular member 94 which extends above the saw table within reach of the operator.

The device herein illustrated and above described is extremely simple in operation. The hollow tubular supports and angle irons impart a minimum of weight so that the device may be tilted and easily wheeled to any desired location and an adequate degree of rigidity and durability during sawing operations.

Cut-off saws heretofore have been highly unsuited for the cutting of angles of any degree. The indicator blade 20 obviates this objection in the present invention. In cutting angles with the herein described device it is only necessary to make a fine pencil mark on the work piece, then to lay the piece upon the saw table and swing the blade 20 upwardly and over the work piece. The pencil mark is then carefully lined up with the guide edge of the indicator blade to position the piece accurately with respect to the cutting path of the saw. With the work piece held by the hand of the operator in this position the blade 20 may then be raised and lowered to its normal position at the front of the machine and the saw 14 drawn through the work piece by means of pull handle 94.

The stop collars 26 provided on shaft 22 which carries indicator blade 20 permit the blade to assume two different operative positions according to whether the work piece is positioned at the right or the left hand side of the saw. In the construction illustrated, when the work piece is on the right hand side of the saw and the waste to be cut off is at the left hand side of the saw, the shaft 22 will be moved to its extreme leftward position. When the work piece is on the left hand side of the saw and the waste to be cut off is at the right hand side of the saw, the shaft 22 is moved to its extreme rightward position. The indicator blade thus makes possible the cutting of all angles, rapid duplication of angles, rapid duplication of an angle on a piece already cut and many other applications which will become apparent to the operator.

Work guide 28 may be employed in conjunction with or independently of indicator blade 20 by adjustment of wing nuts 30 so as to support the work in any desired angular relationship with respect to the saw 14, such for example as is illustrated in Fig. 3.

The graduated squaring guide 16 permits the cutting of lumber of any length within the capacity of the guide without other measurement, and the support 18 as shown in Fig. 1 which prevents the cut-off piece from falling to the floor is a convenience in successful cutting operations. If desired, a small stop may be clamped to the squaring guide when cutting any duplication of lengths.

While cut-off saws are not ordinarily intended for ripping, the squaring guide 16 in the present invention, the guard 34 and pull handle 94 are designed to be removable so that an improvised ripping guide may be clamped to the table enabling the device to be used for occasional jobs of ripping.

In a convenient form of construction for ordinary purposes the motor 82 may be a one-half horsepower electric motor and the saw 14 in the neighborhood of 8 inches in diameter. Such a construction is adapted to cut lumber up to about 2¼ inches in thickness in a single pass.

It will be understood that the herein invention is not limited to the particular construction specifically shown and described but is capable of such interchange, omission, and addition of elements and any other modification as may come within the scope of the following claims.

What is claimed is:

1. A cut-off saw comprising in combination a portable frame structure, a saw table hingedly supported upon said frame structure, transverse cross members carried one each at the forward and rearward ends of said frame structure, a pair of inverted V-shaped rails secured to said cross members and extending longitudinally of said frame structure, a traveling circular saw carriage having peripherally grooved rollers in engagement with said rails to support said carriage upon and for longitudinal movement along said rails, means carried by the forward and rearward ends of said rails and engageable with said traveling saw to limit its longitudinal movement, laterally projecting means secured to said carriage and engageable with the undersurface of said rails to prevent upward displacement of said carriage, stud means fixed to said hinged saw table and extending through enlarged apertures in the frame structure, means for releasably securing said studs in said apertures whereby the alignment of the saw table with respect to said circular saw may be adjusted, an indicator blade pivotally mounted upon said saw table swingable into and out of position over the work piece to indicate the line of cut thereon and shiftable laterally into different positions according to the side of the saw receiving the work piece and a pull handle removably secured to said carriage and extending above said saw table for passing said saw across the work piece.

2. A cut-off saw comprising in combination a portable frame structure, a saw table hingedly supported upon said frame structure, a traveling saw carriage including a circular saw carried by said frame structure, studs fixed to said saw table and extending through enlarged apertures in said frame structure, means for releasably securing said studs in said apertures whereby the alignment of said saw table with respect to said saw may be adjusted, an indicator blade adjustably pivoted to said frame structure and movable into and out of position over a work piece with an edge thereof in substantial alignment with the cutting path of the traveling saw to indicate the line of cut upon the work piece and an adjustable pull handle secured to said carriage and extending above the saw table for passing said saw across the work.

3. A cut-off saw comprising in combination a portable frame structure, a saw table hingedly supported upon said frame structure, a traveling saw carriage including a circular saw carried by trackways on said frame structure, studs fixed to said saw table and extending through enlarged apertures in said frame structure, means for releasably securing said studs in said apertures whereby the alignment of said saw table with respect to said saw may be adjusted; and means projecting from said carriage for moving said saw carriage.

4. A cut-off saw comprising in combination a portable frame structure, a saw table hingedly supported upon said frame structure, a traveling saw carriage including a circular saw carried by said frame structure, studs fixed to said saw table and extending through enlarged apertures in said frame structure, means for releasably securing said studs in said apertures whereby the alignment of said saw table with respect to said saw may be adjusted, an indicator blade adjustably pivoted to said frame structure and movable into and out of position over a work piece with an edge thereof in substantial alignment with the cutting path of the traveling saw to indicate the line of cut upon the work piece and an adjustable pull handle secured to said carriage and extending above the saw table for passing said saw across the work piece.

5. A cut-off saw comprising in combination a portable frame structure, a saw table supported upon said frame structure, a traveling saw carriage including a saw carried by said frame structure, an adjustable indicator blade pivotally mounted on said saw table and having a guide edge movable into and out of position above the saw table and on the work piece with said guide edge in alignment with the cutting path of the saw to indicate the line of cut upon the work piece and means for moving said saw carriage.

6. In combination with a saw table including a saw movable in a predetermined path from a retracted position to a cutting position and adapted to receive a work piece, an indicator blade pivotally secured to said table and movable into and out of position over said work piece and in contact therewith, the end of said blade being spaced from said saw when said saw is in retracted position, with an edge of said indicator blade in such position in substantial alignment with said path whereby to indicate the line of cut upon the work piece.

7. In combination with a saw table adapted to receive a work piece and including a saw movable in a predetermined path from a retracted position to a cutting position to cut the work piece, an indicator blade pivotally secured to said table, said indicator blade being movable into and out of position over said work piece and in contact therewith whereby to indicate the line of cut upon the work piece, the end of said blade being spaced from said saw when said saw is in retracted position, said blade being shiftable laterally into different positions according to the side of the saw receiving the work piece.

JAMES M. HUMPHREY.

REFERENCES CITED

The following references are of record in the file of this patent:

UNITED STATES PATENTS

| Number | Name | Date |
| --- | --- | --- |
| 176,531 | Hoffman | Apr. 25, 1876 |
| 428,773 | Ham | May 27, 1890 |
| 752,701 | Norlin | Feb. 23, 1904 |
| 881,064 | Favreau | Mar. 3, 1908 |
| 1,618,341 | Howland | Feb. 22, 1927 |
| 1,763,478 | Palmeter | June 10, 1930 |
| 1,792,955 | Willis | Feb. 17, 1931 |
| 1,793,392 | Francyk | Feb. 17, 1931 |
| 1,825,104 | Staeheli | Sept. 29, 1931 |
| 1,960,590 | McKay | May 29, 1934 |
| 2,247,314 | Sellmeyer | June 24, 1941 |
| 2,307,820 | Butters | Jan. 12, 1943 |
| 2,310,813 | Sellmeyer | Feb. 9, 1943 |
| 2,396,961 | Meredith | Mar. 19, 1946 |

FOREIGN PATENTS

| Number | Country | Date |
| --- | --- | --- |
| 140 of 1899 | Great Britain | Jan. 3, 1899 |
| 120,047 | Switzerland | May 2, 1927 |
| 645,577 | Germany | June 1, 1937 |